United States Patent Office 3,560,523
Patented Feb. 2, 1971

---

3,560,523
2-SUBSTITUTED $\Delta_1$-PYRROLINE DERIVATIVES AND METHOD OF PREPARATION
André Etienne, Paris, and Yves Correia, Saint-Auban, France, assignors to Pechiney-Saint-Gobain, Paris, France
No Drawing. Filed Nov. 1, 1967, Ser. No. 679,651
Claims priority, application France, Nov. 3, 1966, 82,355
Int. Cl. C07d 27/14
U.S. Cl. 260—326.9                                    7 Claims

ABSTRACT OF THE DISCLOSURE

The invention is concerned with the preparation of 2-substituted $\Delta_1$-pyrroline derivatives having the formula

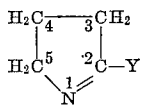

in which Y is a substituted alkyl group in which the substituent is nitro, cyano, carbonyl and/or alkyl-carboxyl by reaction of 2-alkoxy $\Delta_1$-pyrroline with a labile hydrogen compound containing the Y group.

---

This is an improvement over our copending applications Ser. No. 676,027, filed Oct. 18, 1967, entitled "2-Substituted $\Delta_1$-Pyrroline Derivatives and Method of Preparing Same" and Ser. No. 679,593, filed Oct. 18, 1967, entitled "2-Amino Substituted $\Delta_1$-Pyrroline Derivatives and Method of Preparing Same," both abandoned, which in turn are continuations-in-part of our copending application Ser. No. 390,726, filed Aug. 19, 1964, entitled "2-Substituted $\Delta_1$-Pyrroline Derivatives and Method of Preparing Same," now abandoned, and included herein by reference.

The aforementioned applications relate to 2-substituted $\Delta_1$-pyrroline derivatives having the formula

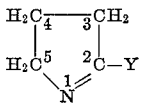

in which Y represents one or more groups such as alkoxy groups having at least two carbon atoms, alkenoxy, alkynoxy or saturated aliphatic hydrogen groups having at least three carbon atoms; unsaturated aliphatic hydrocarbon groups, substituted aromatic groups; substituted or unsubstituted cyclic groups, saturated or unsaturated, substituted or unsubstituted heterocyclic groups, amino groups substituted or unsubstituted with hydrocarbon residues or groups of the elements Si, Sn, P, As, Sb or elements of the Group III(b), IV(b) or VII(b) of the Mendelejeff AF periodic classification of elements.

As described in the aforementioned copending applications, one means for the preparation of the 2-substituted derivatives of $\Delta_1$-pyrroline comprises the double decomposition or exchange between an alkoxy derivative in the 2 position of the $\Delta_1$-pyrroline with a compound having a functional hydroxyl group containing the Y group, such as an alcohol, preferably a primary alcohol, as well as functional complex compounds having an OH group.

This application is addressed to a new series of 2-substituted $\Delta_1$-pyrroline derivatives in which Y represents an alkyl group substituted by such groups as nitro, cyano, carbonyl and/or alkyl-carboxyl e.g. acetylacetone, diacetyl, acetylacetates.

In accordance with one method for preparing the derivatives of this invention, a double decomposition or exchange reaction is carried out between an alkyl derivative on the 2 position of the $\Delta_1$=pyrroline and a mobile hydrogen compound containing the Y group or groups to be substituted on the 2 position, as represented by the following equation:

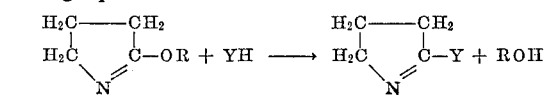

in which R represents an alkyl group and Y is a group as described above.

The reactants can be employed in stoichiometric proportions, with one or the other of the reactants present in amounts in excess of the stoichiometric amounts.

The exchange reaction or double decomposition is carried out at a temperature within the range of 70–200° C. under atmospheric pressure or autogenic pressure. In some instances, it is desirable to make use of pressure below one bar.

The reactants may be taken into solution in an appropriate solvent such as benzene, toluene, xylene, cyclohexane and it is preferred, in the practice of this invention, to take one or the other of the reactants into solution.

The reaction time will depend somewhat upon the reactants used and particularly on the 2-alkoxy-$\Delta_1$-pyrroline employed as a reactant. By way of illustration, the reaction may take as long as 20 hours.

The reaction products may be separated by any one of a number of appropriate well known separating techniques such as by distillation, steam distillation, or crystallization.

The 2-substituted $\Delta_1$-pyrroline derivatives of this invention enjoy good insecticidal properties. In tests conducted with an acetone solution of nitromethyl-2-$\Delta_1$-pyrroline on a calendar, the observed mortality rate is 50% with a $5 \times 10^{-3}$ concentration of the first and 100% with a $1 \times 10^{-3}$ concentration of the second. In another series of tests embodying the ingestion of each of the two compounds described above from acetone solution, on *Ephestia kuehniella*, a mortality rate of 100% is achieved for both compounds at a concentration of $1 \times 10^{-4}$.

As a further use, the 2-substituted $\Delta_1$-pyrroline derivatives of this invention find utility as intermediates in the synthesis of other pyrrolines.

The following examples are given by way of illustration, but not by way of limitation, of methods for the preparation of substituted pyrrolines of this invention:

EXAMPLE 1

Preparation of nitromethyl-2-$\Delta_1$-pyrroline 1 mole of methoxy-2-$\Delta_1$-pyrroline and 2 moles of nitromethane are refluxed for 15 hours and then the unreacted ingredients are removed by distillation.

A crystallized solid of straw color is obtained having a melting point of 108° C. Crystals having the same melting point are obtained upon re-crystallization in 95% methanol. The mole yield of nitromethyl-2-$\Delta_1$-pyrroline is 40%.

EXAMPLE 2

Preparation of diacetyl methyl-2-$\Delta_1$-pyrroline

Following the procedure of Example 1, acetylacetone and methoxy-2-$\Delta_1$-pyrroline are reacted to give a mole yield of 97% diacetyl methyl-2-$\Delta_1$-pyrroline in the form of a white solid having a melting point of 88° C. after re-crystallization from a mixture of benzene and cyclohexane.

EXAMPLE 3

Preparation of ($\Delta_1$-pyrrolinyl-2′)-2 ethyl cyanoacetate 1 mole of methoxy-2$\Delta_1$-pyrroline is refluxed with 1 mole of ethyl cyanoacetate during 8 hours and then the unreacted ingredients are removed by distillation. A mole yield of 78% of ($\Delta_1$-pyrrolinyl-2′)-2 ethyl cyanoacetate is obtained in the form of a white solid which, after re-crystallization in ethanol, has a melting point of 155° C.

EXAMPLE 4

Preparation of ($\Delta_1$-pyrrolinyl-2′)-2 ethyl acetyl acetate

Following the procedure of the preceding examples, about 1 mole methoxy-2-$\Delta_1$-pyrroline is reacted with about 1 mole of ethyl acetyl acetate to give a molar yield of 81% of ($\Delta_1$-pyrrolinyl-2′)-2 ethyl acetyl acetate as a white solid which, after re-crystallization in cyclohexane, has a melting point of 92° C.

It will be understood that changes may be made in the details of formulation and conditions for reaction without departing from the spirit of the invention as set forth in the following claims.

We claim:

1. A 2-substituted $\Delta_1$, pyrroline compound having the formula:

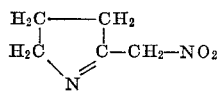

2. The method for the preparation of a compound of the formula:

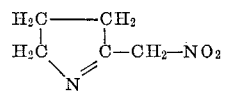

comprising reacting 2-methoxy $\Delta_1$ pyrroline with nitro methane at a temperature within the range of 70–200° C.

3. The method as claimed in claim 2 in which the reactants are reacted in stoichiometric amounts.

4. The method as claimed in claim 2 in which one of the reactants is present in an amount in excess of the stoichiometric amount.

5. The method as claimed in claim 2 in which the reaction is carried out under a pressure ranging from atmospheric pressure to autogenic pressure.

6. The method as claimed in claim 2 in which at least one of the reactants is taken into solution before reaction.

7. The method as claimed in claim 6 in which the solvent for one or both of the reactants is selected from the group consisting of benzene, toluene, xylene and cyclohexane.

References Cited

FOREIGN PATENTS 1,383,784   1/1965   France _____ 260—326.9

ALEX MAZEL, Primary Examiner

J. A. NARCAVAGE, Assistant Examiner

U.S. Cl. X.R.

260—326.3, 326.5, 326.62, 999